United States Patent [19]
Tajiri

[11] Patent Number: 6,072,757
[45] Date of Patent: Jun. 6, 2000

[54] APPARATUS AND METHOD FOR DETERMINING A DISK TYPE PRIOR TO REPRODUCING DATA FROM THE DISK

[75] Inventor: Takashi Tajiri, Saitama, Japan

[73] Assignee: Sony Corporation, Tokyo, Japan

[21] Appl. No.: 08/955,847

[22] Filed: Oct. 21, 1997

[30] Foreign Application Priority Data

Oct. 25, 1996 [JP] Japan ................................. 8-283568

[51] Int. Cl.⁷ ........................................ G11B 7/00
[52] U.S. Cl. ........................... 369/58; 369/54; 369/47
[58] Field of Search ............................ 369/58, 47, 48, 369/49, 50, 54, 59, 32; 360/48, 51, 53

[56] References Cited

U.S. PATENT DOCUMENTS 5,153,879  10/1992  Tanaka et al. ........................... 371/2.1
5,289,451   2/1994  Ashinuma et al. ........................ 369/58

FOREIGN PATENT DOCUMENTS 0 691 652  1/1996  European Pat. Off. .
0 724 263  7/1996  European Pat. Off. .

OTHER PUBLICATIONS

Patent Abstracts of Japan vol. 010, No. 137 (E–405), JP 60 264173 A (Hitachi Seisakusho KK), Dec. 27, 1985.

Primary Examiner—Muhammad Edun
Attorney, Agent, or Firm—Frommer Lawrence & Haug, LLP.; William S. Frommer

[57] ABSTRACT

A type of disk in a reproducing device is accurately determined prior to data reproduction. To determine whether the disk type is Compact Disk (CD) or Digital Video Disk (DVD), a track pitch on the disk is examined, while the difference between the DVD Single Layer and DVD Dual layer is based on disk reflectance values. When thus determined disk type turns out to be incorrect, an operation is carried out for estimating the correct disk type based on the highest likelihood of the disk type following the initial (incorrect) decision. The process is carried out until the correct disk type is identified, or the disk is determined to be unusable.

21 Claims, 9 Drawing Sheets

The case where a wrong discrimination is made more easily in the dual layer/single layer discrimination

| The first-judged disc type | The disc type with the highest probability next to the first-judged disc type | The disc type with the second highest probability |
|---|---|---|
| DVD, Single Layer | → DVD, Dual Layer | CD |
| DVD, Dual Layer | → DVD, Single Layer | CD |
| CD | → DVD, Single Layer | DVD, Dual Layer |

FIG. 8

APPARATUS AND METHOD FOR DETERMINING A DISK TYPE PRIOR TO REPRODUCING DATA FROM THE DISK

BACKGROUND OF THE INVENTION

The present invention is related to reproducing data from a disk, and more particularly to apparatus (and the corresponding method) operative to ascertain quickly and accurately the type of disk from which the data is reproduced by playback apparatus (or the playback steps).

It is apparent that the popularity of a Digital Video Disk (DVD) is currently growing very rapidly. Typically, the DVD may be a Single Layer disk (DVD SL disk) with one data layer for recording/reproducing data or a Dual Layer disk (DVD DL disk) having two data layers. Both disk types can be used interchangeably by a reproducing device (apparatus). In addition to the DVD, data from a Compact Disk (CD) can also be reproduced by this reproducing device. Thus, at least three disk types may be used by the single reproducing device.

Although the physical shape (diameter) of each disk type (DVD SL disk, DVD DL disk, and CD) may be the same, each of these disks operates with unique parameters (operating conditions) set by the reproducing device. This is due to the fact that data formats and/or internal disk structures for data storage are different among the DVD SL disk, DVD DL disk, and CD, for example. As a result, the reproducing device which can employ any one of the above-mentioned three disks must ascertain which disk type is currently in use.

A control data area is provided in the DVD where the data relating to the disk type may be recorded. Similarly, in the CD, a TOC (Table of Contents) area is allocated for recording, among other things, the data relating to the disk type. Hence, it appears that it is possible to easily determine the type of disk loaded in the device by simply accessing the control data area or the TOC area and by retrieving (reading) the appropriate information in those areas.

A problem, however, is encountered when the reproducing device is operative to read data on the disk. Namely, in order to read data correctly, it is necessary to initialize various servos (drivers) in the reproducing device (such as a focus servo, a tracking servo, a spindle servo, and the like) to their proper states (settings). Unless these servos are locked (the proper operating conditions are established), the data cannot be read from the control data area or the TOC area. For example, it is necessary to adjust the power of a laser beam or the gain of the reproduced RF signal amplification in the reproducing device prior to reproducing data from the disk. If these parameters are not set correctly, the data cannot be read. The disk type, therefore, cannot be determined by using the above seemingly simple approach.

Accordingly, it would be preferable to determine the disk type prior to setting the necessary parameters in the reproducing device. In this respect, it is possible to employ a trial-and-error method. However, after inserting the disk in the device, it would take a long time for the reproducing device to reach a state where the reproduction of data is performed. The situation, of course, becomes even worse as the number of possible disk types increases.

A need therefore exists for a device and method that overcomes the above disadvantage.

OBJECTS OF THE INVENTION

It is, therefore, an object of the present invention to determine a disk type reliably.

Another object of the present invention is to determine a disk type for disks of various formats and/or data recording densities.

It is a further object of the invention to enable to start reproducing data from the disk quickly following the disk type determination.

SUMMARY OF THE INVENTION

According to one aspect, the invention is defined by apparatus for reproducing data from one of a number of disks, where each disk is of a predetermined type. The apparatus includes reproducing means for reproducing data from a disk; detecting means for performing a detection operation to detect the disk type such that the data can be reproduced from the disk correctly; and setting means for setting the reproducing means to a predetermined condition corresponding to another disk type when the detected disk type has been detected erroneously. The predetermined condition is selected, as a function of the detection operation, from at least two other predetermined conditions.

In accordance with another aspect of the invention, the apparatus includes means for performing a differentiating operation to differentiate between a compact disk and a digital video disk such that the detection operation comprises this differentiating operation.

In accordance with still another aspect of the invention, the apparatus includes means for performing a differentiating operation to differentiate between a first digital video disk having the data recorded on two layers and a second digital video disk having the data recorded on one layer such that the detection operation comprises this differentiating operation.

In accordance with yet another aspect of the invention, the setting means sets the reproducing means to the predetermined condition by establishing a number of predetermined parameters such that the data can be reproduced from the disk correctly. These predetermined parameters include a beam focus and/or disk velocity, for example.

BRIEF DESCRIPTION OF THE DRAWINGS

The above-mentioned as well as additional objects, features and advantages of the invention will become readily apparent from the following detailed description thereof which is to be read in conjunction with the accompanying drawings, in which.

In all Figures, like reference numerals represent the same or identical components of the invention.

DETAILED DESCRIPTION OF THE PREFERRED EMBODIMENTS

The present invention will now be explained in detail with reference to the accompanying drawings.

Figure 1:
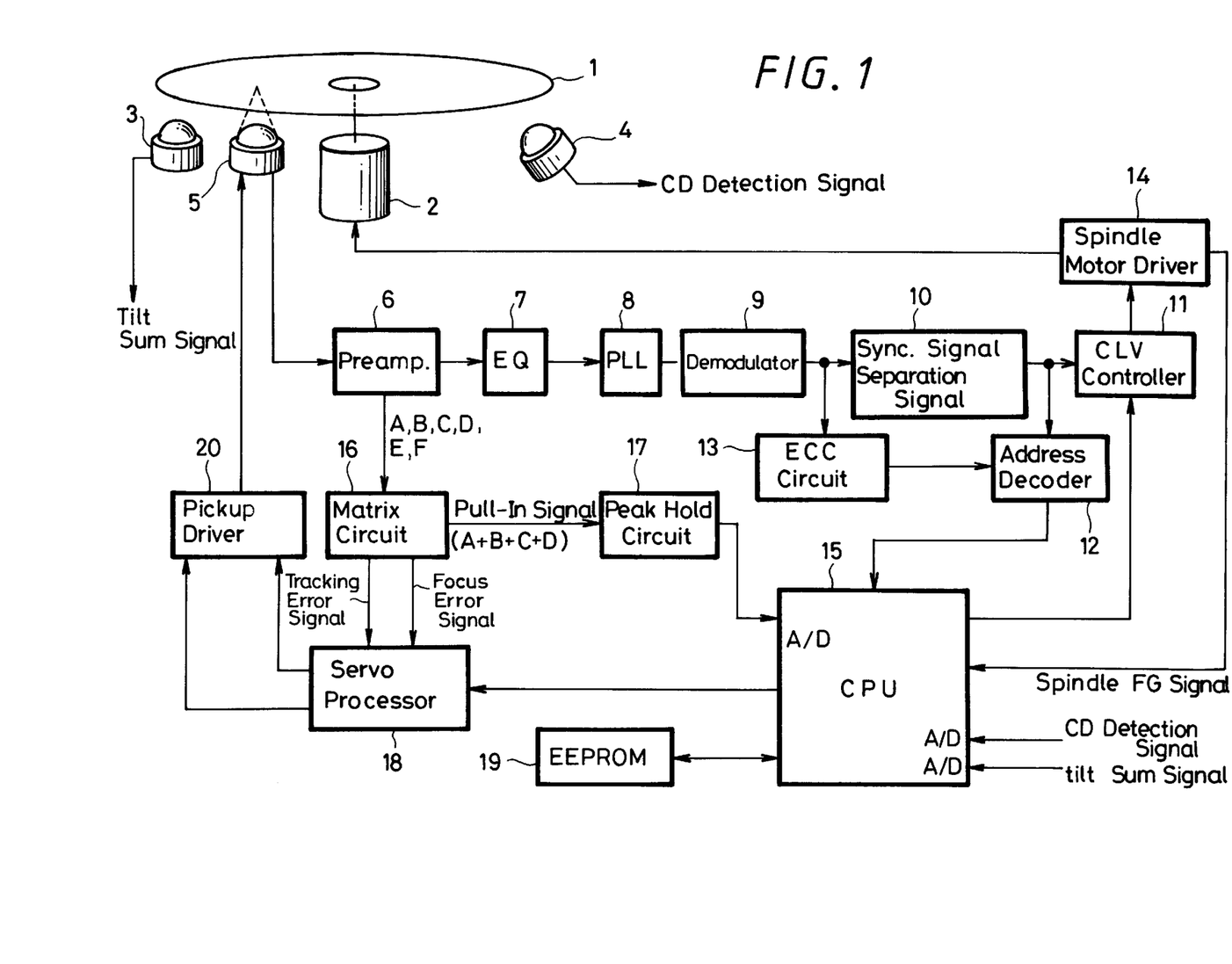
FIG. 1 is a block diagram showing a representative structure of disk reproducing apparatus according to the present invention.

FIG. 1 is a block diagram showing a representative structure of disk reproducing apparatus in accordance with the present invention. A disk 1 (which can be CD, DVD single layer, or DVD double layer, for example) is positioned for rotation at a predetermined speed by a spindle motor 2. A tilt sensor 3 directs a beam of light (produced by a built-in LED, for example) at the disk 1 and receives the reflected light beam (acquired by a built-in photodiode) for detecting the tilt (slant) of the disk 1. The detection result is output by the tilt sensor 3 to a CPU 15 as a tilt sum signal.

Further, a CD discriminating sensor 4 supplies a light beam (produced by a built-in LED) to the disk 1 and determines whether a track pitch on the disk 1 is approximately 1.6 μm (that is, whether the disk 1 is a CD, since the track pitch of the DVD disk is about 0.74 μ). A CD detection signal (indicating whether the disk is CD), is output by the CD discriminating sensor 4 to the CPU 15.

During data reproduction, a pickup 5, comprising a laser diode and a photodiode, directs a laser beam (produced by the laser diode) onto the disk 1 and receives the reflected light beam from the disk 1 by the photodiode. Thereafter, a preamplifier 6 amplifies an electrical signal received from the pickup 5 (that is, the reflected light beam received by the photodiode of the pickup 5 is transformed via a photoelectric conversion to an electrical data reproduction signal) and outputs it to an equalizer 7. After processing the data reproduction signal to conform to specified characteristics, the equalizer supplies the processed signal to a PLL circuit 8 which derives a clock signal therefrom. The derived clock signal, together with the data reproduction signal, is provided to a demodulator 9.

The data reproduction signal is demodulated by the demodulator 9 after being synchronized with the clock signal. The output from the demodulator 9 is supplied to a synchronization signal separator circuit 10 and an ECC circuit 13. The synchronization signal separator circuit 10 extracts a synchronization signal and outputs it to a CLV (constant linear velocity) controller 11 and an address decoder 12, while the ECC 15 circuit 13 outputs the demodulated data signal to the address decoder 12 after performing an appropriate processing operation to correct errors in the modulated data, if necessary. On the basis of the synchronization signal supplied from the synchronization separator circuit 10, the address decoder 12 generates an address from the error-corrected data supplied from the ECC circuit 13. As shown in FIG. 1, the decoded address is input to the CPU 15.

Further, the CLV controller 11, under control of the CPU 15, is operative to control a spindle motor driver 14 for driving the spindle motor 2. The spindle motor driver 14 also produces a spindle FG signal corresponding to the rotational frequency of the spindle motor 2. The spindle FG signal is provided to the CPU 15.

The pickup 5 is adapted to reproduce data by using a so-called three beam method (when reproducing data from the CD), and by using one beam method (when reproducing data from the DVD). In the pickup 5, the photodiode for reproducing the data is divided into four representatively named sections A, B, C and D; and a photodiode for tracking the CD is divided into two representatively named sections E and F.

As illustrated in FIG. 1, the preamplifier 6 outputs the individual signals from the photodiodes A through F to a matrix circuit 16. The matrix circuit 16, among other things, combines (adds) the signals of the photodiodes A through D, and outputs the added signal to a peak hold circuit 17 as a Pull-In signal. The peak hold circuit 17 detects a peak value of the Pull-In signal and outputs the detected peak value to the CPU 15.

In addition, the matrix circuit 16 calculates a so-called diagonal signal as (A+C)−(B+D) from the output signals of the photodiode sections positioned diagonally in the pickup 5, such that a focus error signal is generated. Furthermore, in a case where the disk 1 is CD, the difference (E−F) in the output signals from the photodiode sections E and F is calculated, resulting in a tracking error signal. When the disk 1, however, is DVD, the tracking error signal is produced by a Differential Phase Detection (DPD) method as a function of the diagonal signal and the Pull-In signal.

A servo processor 18 receives the focus error signal and the tracking error signal from the matrix circuit 16, and adjusts these signals appropriately as output to a pickup driver 20. The pickup driver 20 (focus servo) is arranged to move the pickup 5 in the focus direction or the tracking direction in accordance with the focus error signal or the tracking error signal, respectively, while also being operative to adjust the pickup 5 in the radial direction of the disk 1.

Also shown in FIG. 1 is an EEPROM 19. Among other things, the EEPROM 19 stores a PI (sldisk, slmode) level of the Pull-In signal when data from the DVD SL disk is reproduced in the SL mode (a mode where the parameters for the DVD SL disk are set), and a PI (dldisk, dlmode) level of the Pull-In signal when data from the DL disk is reproduced in the DL mode (a mode where the parameters for the DVD DL disk are set). These signals will be further explained hereinbelow.

Next, the operation of the disk reproducing device as illustrated in the block diagram of FIG. 1 and described hereinabove will be explained with reference to the flowcharts of FIGS. 2–4.

Figure 2:
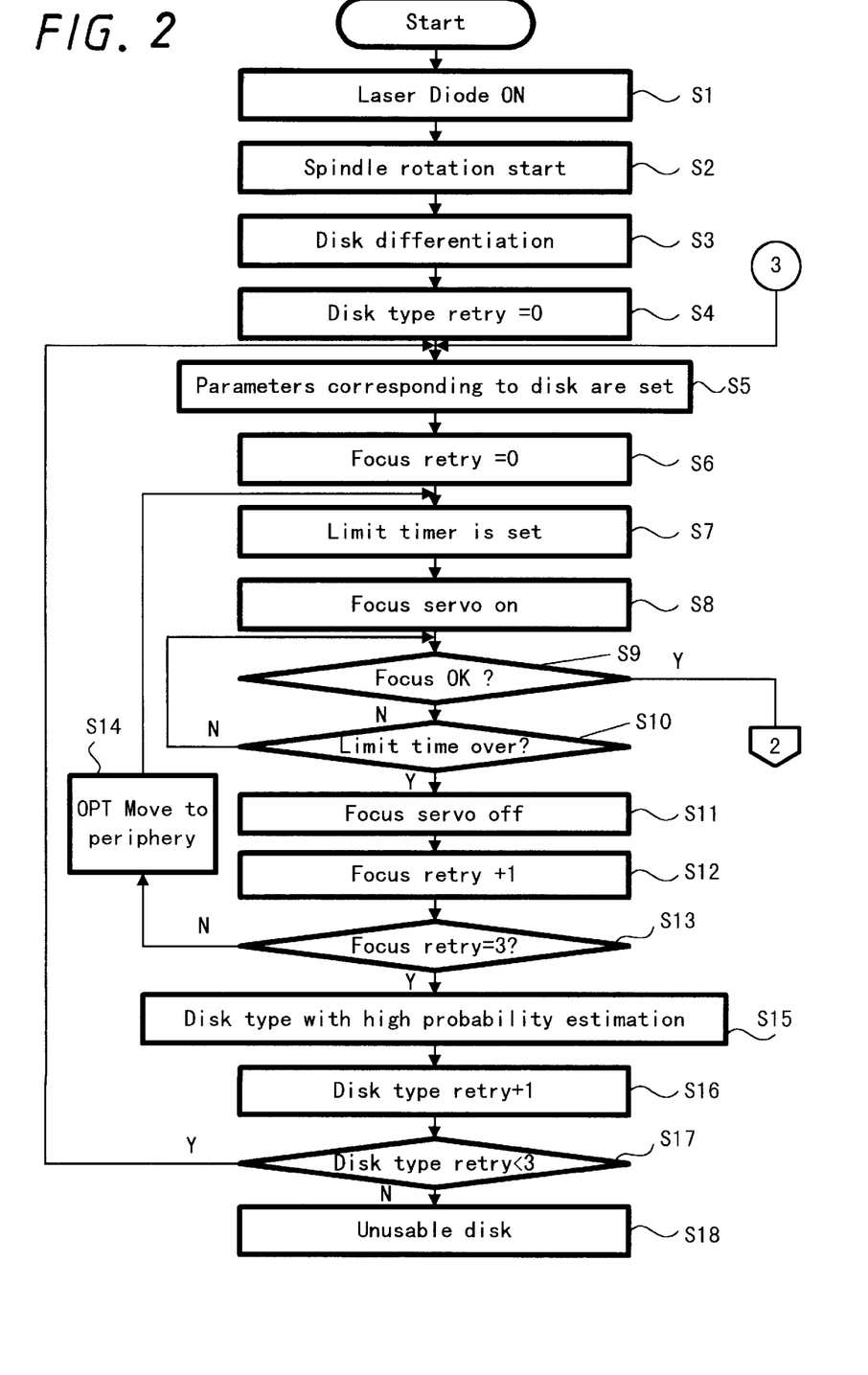
FIG. 2 is a flowchart showing the operation of the disk reproducing apparatus of FIG. 1.
Figure 3:
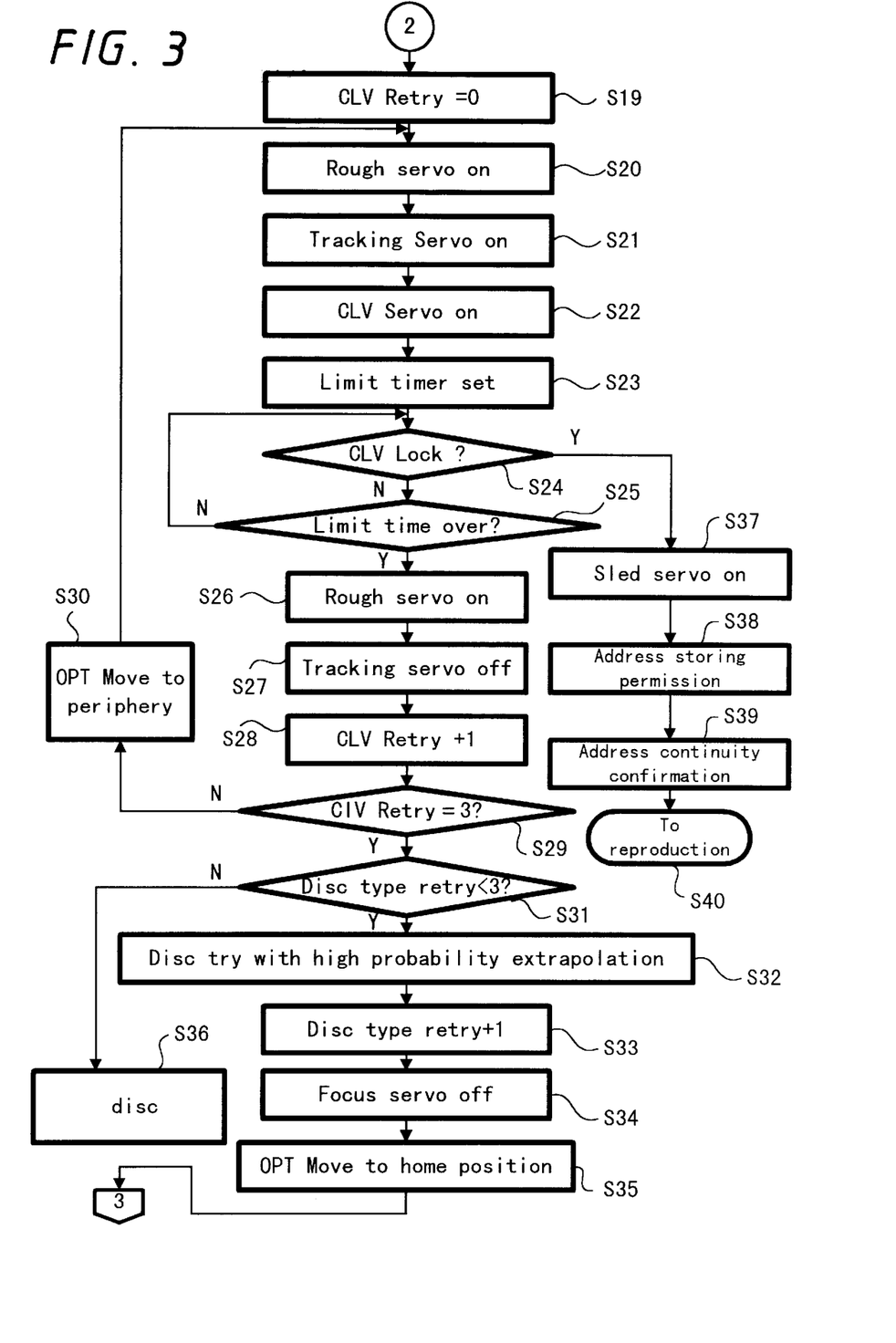
FIG. 3 is a continuation of the flowchart of FIG. 2.

In FIG. 2, in step S1, the CPU 15 is programmed to activate the laser diode of the pickup 5 for generating a laser beam. Consequently, the generated laser beam is directed onto the disk 1, wherein the reflected light is received by the photodiode of the pickup 5. Then, the output of the photodiode is supplied to the preamplifier 6.

Next, in step S2, the CPU 15 is operative to control the spindle motor driver 14 (via the CLV controller 11) for driving the spindle motor 2. In step S3, the CPU 15 performs the processing operation for discriminating the disk 1. This processing operation includes the step of distinguishing between the DVD and the CD, and the step of distinguishing between the DVD DL and the DVD SL when the disk 1 is inserted in the reproducing device.

Figure 4A:
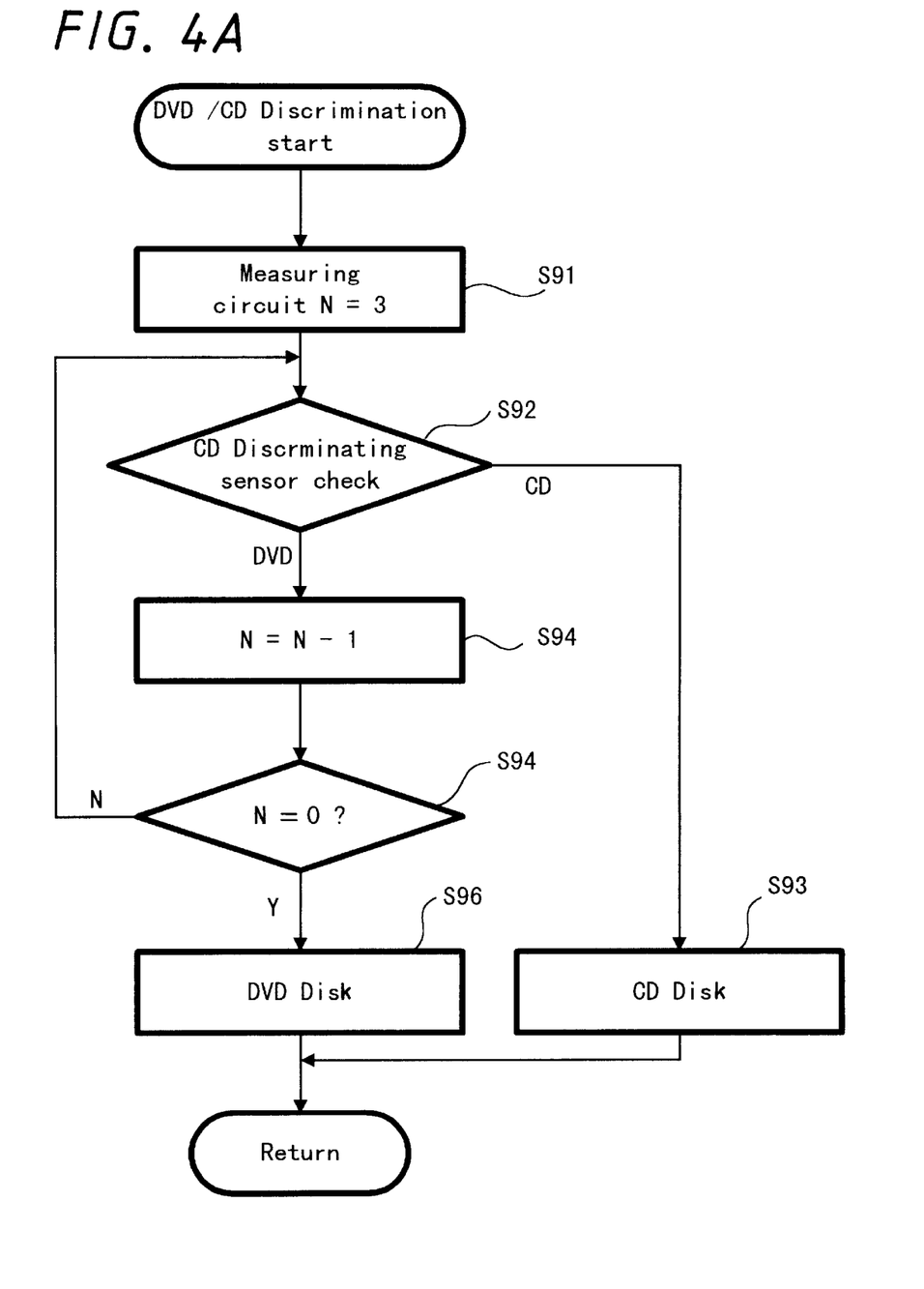
FIG. 4A is a flowchart elaborating on step S3 of FIG. 2, listing steps for differentiating between a DVD and a CD.
Figure 4B:
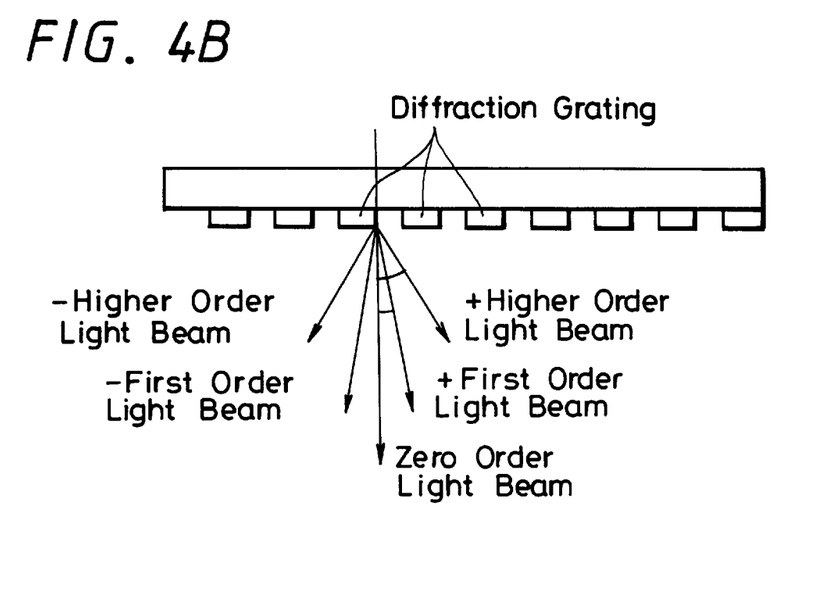
FIGS. 4B and 4C illustrate a principle behind the DVD/CD discrimination.
Figure 4C:
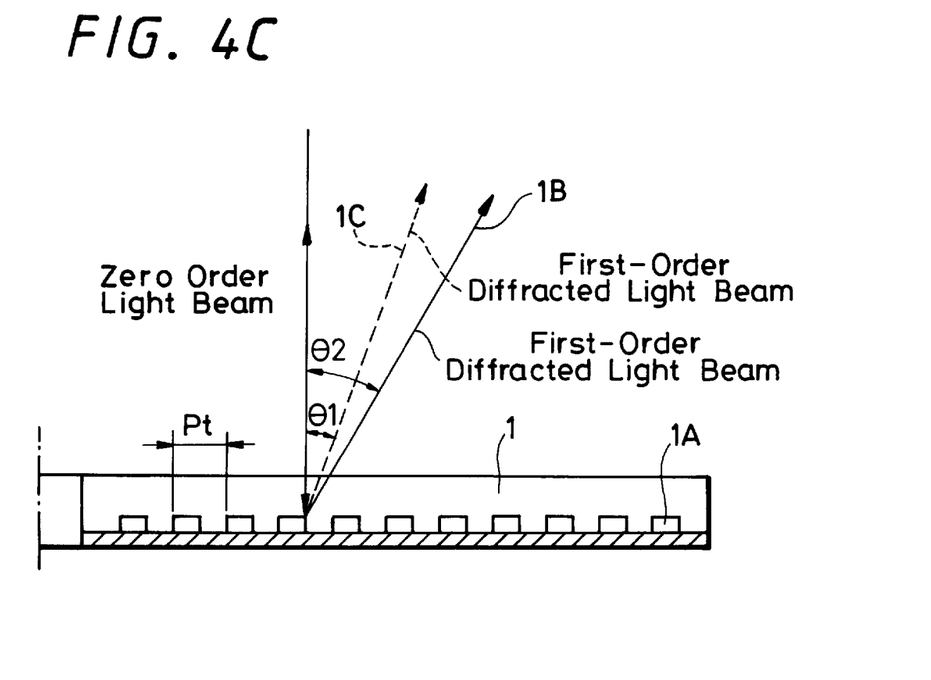

The processing operations for discriminating between the DVD and CD are shown in detail in the flowchart in FIG. 4A and in FIGS. 4B and 4C. That is, the flowchart in FIG. 4A illustrates some of the operations included in step S3 of FIG. 2, while FIGS. 4B and 4C show the principle behind the DVD/CD discrimination.

Figure 5:
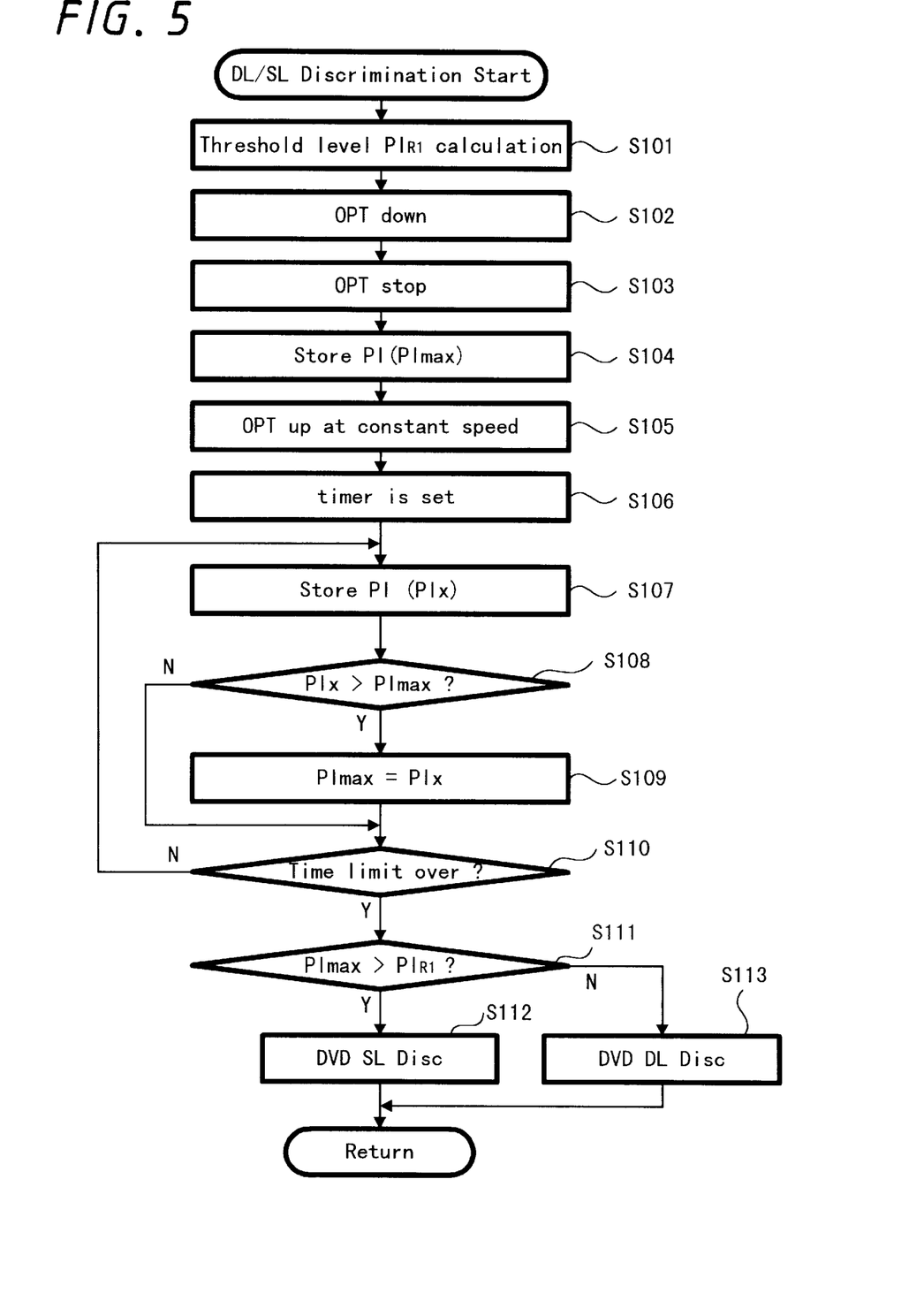
FIG. 5 is a flowchart elaborating on step S3 of FIG. 2, listing steps for differentiating between a DVD DL and a DVD SL.

When coherent light is directed to diffraction grating formed on the disk 1 as shown in FIG. 4B, the incident light is divided into diffracted light beams, namely, a so-called zero order light beam which proceeds in the same direction as the incident light, and other diffracted light beams in divergent directions including so-called +first order light beam, +third order light beam, . . . , +higher order light beam, −first order light beam, −second order light beam, . . . , −higher order light beam. When the light is irradiated onto the disk 1 as shown in FIG. 5, the light beams diffracted by a pit 1A are reflected and returned according to a diffraction pattern as shown in the figures.

In such a case, the angle divergence from the zero-order light beam depends on a track pitch Pt. When the track pitch is about 1.6 μm in the disk 1 (being a CD type), a first-order diffracted light beam 1B is returned (reflected) as shown in FIG. 4C. The angle θ1 represents the diffraction angle for the CD. Alternatively, when the track pitch is about 0.74 μm in the disk 1 (being a DVD type), a first-order diffracted light beam 1C is returned (reflected) as shown in FIG. 4C. The angle θ2 represents the diffraction angle for the DVD, which is larger than θ1. Based on the output of the CD discriminating sensor 4, the type of disk 1 can be identified. Since the angular difference between the diffraction angle θ1 and the diffraction angle θ2 is typically about several degrees, the type of disk 1 can be ascertained with great reliability.

Turning now to the flowchart in FIG. 4A, in step S91, a representative memory storage labeled "N" for storing the number of times that the below-described detection takes place is initialized to 3. In step S92, the CD detection signal from the CD discriminating sensor 4 is checked by the CPU 15. When the CD detection signal contains information indicating that the measured track pitch corresponds to about 1.6 μm, the process advances to step S93. In step S93, after receiving and processing the CD detection signal, the CPU 15 executes appropriate instructions for indicating that disk 1 is CD.

In step S92, if the CPU 15 determines that the information carried by the CD detection signal is not indicative of the CD disk type, the CPU 15 is operative to execute instructions for temporarily assuming that the disk type is DVD. Accordingly, in this case, the process advances to step S94 and the value in N is decreased by one. Then, a determination is made in step S95 whether the value in N is equal to 0. If N does not contain 0, the process returns to step S92 and once again the output from the CD discriminating sensor 4 is checked. It is apparent that a time interval has elapsed by the time the output from the CD discriminating sensor 4 is checked again (that is, when N is less than 3, for example). Since the disk 1 continues rotating during this time interval, the laser beam is most likely directed to a different position on the disk 1 than before. The discriminating sensor 4 receives the light beam reflected from the new area of the disk 1, and performs the detection processing on the newly reproduced data. Hence, even if the type of disk was not detected as CD during the first detection because of a possible disk contamination or imperfection in the area of the disk illuminated by the laser diode, the disk 1 is correctly detected during the second detection (based on the data reproduced from the new position on the disk 1), provided, of course, that the disk type is CD. In this case, the CPU 15 is programmed to carry out appropriate instructions for the CD disk type.

When the CD discriminating sensor 4 does not output the CD detection signal the second time (or the CD detection signal does not contain information, as processed by the CPU 15, indicating that the disk 1 is CD), the CD detection signal is checked once more and the process returns to step S92. Consequently, three detection operations are performed in accordance with this representative embodiment of the invention. If, in step S94, N is equal to 0, the processing in step S96 is carried out such that the disk 1 type is set to DVD. In this case, the details of the processing operation for differentiating between the DVD DL disk and DVD SL disk are shown in the flowchart of FIG. 5.

In particular, in step S101, the CPU 15 executes instructions for calculating a threshold level $PI_{r1}$ defined by the following equation:

$$PI_{r1} = ((PI(dldisk, slmode) + PI(sldisk, slmode))/2 = \qquad (1)$$
$$((PI(dldisk, dlmode) - PIref) \times (a/b) \times (c/d) +$$
$$((PI(sldisk, slmode) - PIref)) \times (e/f) \times (1/2) + PIref$$

The equation (1) will now be explained. In the DVD, when an SL disk is compared to a DL disk, it will be appreciated that the SL disk has a larger reflectance value (that is, the reflected light beam intensity is higher) than the DL disk. The threshold level $PI_{r1}$ is used for differentiating between the SL disk and the DL disk based on a difference in the reflectance value.

Figures 6A, 6B, 6C:
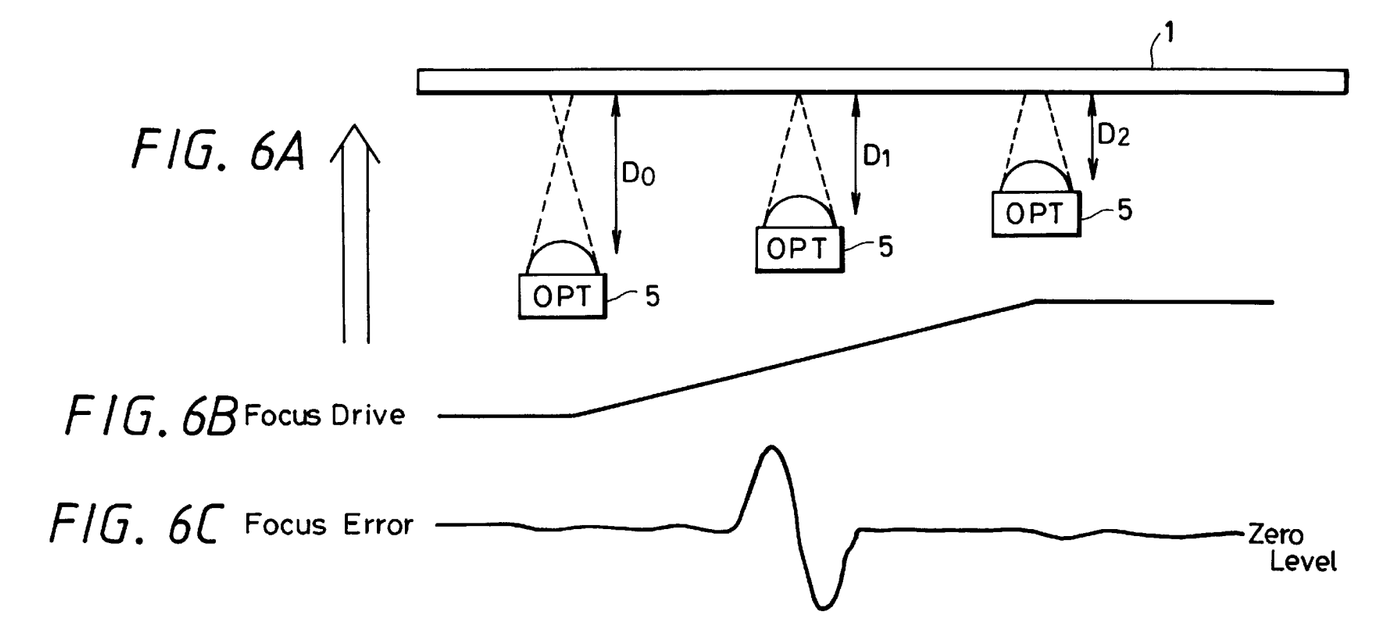
FIGS. 6A–6D illustrate operations of pickup 5 and various signals in accordance with the flowchart of FIG. 5 for differentiating between the DVD DL and the DVD SL.
Figure 6D:
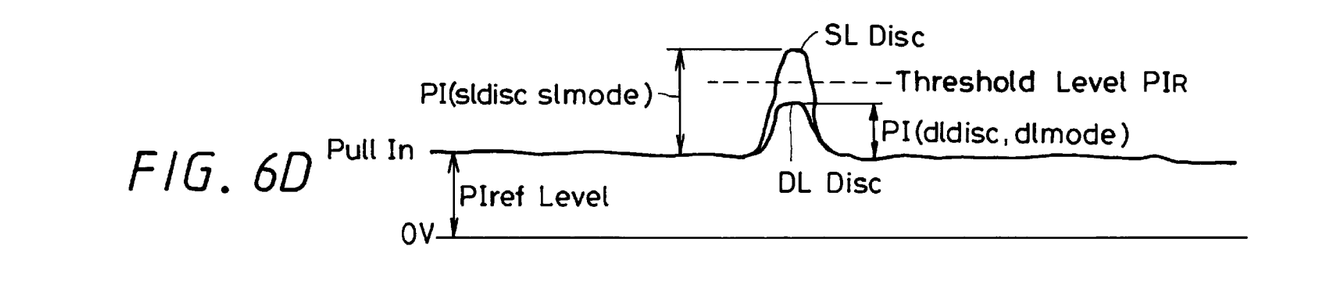

In particular, a focus error signal (as shown in FIG. 6C) deviates from its zero level as objective lens of the pickup 5 (labeled in the figure as a so-called OPT) is gradually brought closer to the disk 1 (as represented by distances $D_0$, $D_1$, $D_2$ in FIG. 6A) in the direction of the arrow (the focus direction) to its optimum position (the distance $D_1$ in FIG. 6A). The pickup 5 movement is realized via the pickup driver 20 outputting a drive voltage as shown in FIG. 6B. Then, in accordance with FIG. 6D, the Pull-In signal becomes maximum when the focus error signal (FIG. 6C) approximately crosses the zero level. Since the SL disk has a larger reflectance value than the DL disk, the level of the Pull-In (PI) signal is larger for the SL disk than the DL disk in the vicinity of the zero-crossing by the focus error signal, as illustrated in FIG. 6D (that is, PI(sldisk, slmode) is greater than PI (dldisk, slmode)). The threshold level $PI_{r1}$ is preset to an intermediate value between the Pull-In signal of the SL disk (PI(sldisk, slmode)) and the Pull-In signal of the DL disk (PI (dldisk, slmode)).

As mentioned above, the EEPROM 19 stores the PI (sldisk, slmode) of the Pull-In signal when the data from the DL disk is reproduced in the DL mode (excluding the DC component, a so-called $PI_{ref}$ level), and stores the PI (dldisk, dlmode) of the Pull-In signal when the data from the SL disk is reproduced in the SL mode (also excluding the $PI_{ref}$ level). The threshold level $PI_{r1}$ selected as the approximate intermediate value between the PI(sldisk, slmode) and PI(dldisk, slmode) is adequate for differentiating between the two.

The Pull-In signal values, however, may vary as a function of the laser power or its gain, or may depend on whether the focus servo is turned on in the reproducing device. Let a ratio of LPSL and LPDL be as follows:

$$LP_{SL}:LP_{DL}=a:b$$

where $LP_{SL}$ is an SL mode parameter and $LP_{DL}$ is a DL mode parameter relating to the laser power.

Similarly, let a ratio of $G_{SL}$ to $G_{DL}$ be as follows:

$$G_{SL}:G_{DL}=c:d$$

where $G_{SL}$ is an SL mode parameter and $G_{DL}$ is a DL mode parameter relating to the laser gain.

Furthermore, let a ratio of $PI_{focusoff}$ to $PI_{focuson}$ be as follows:

$$PI_{focusoff}:PI_{focuson}=e:f$$

where $PI_{focusoff}$ is a Pull-In signal level when the focus servo is turned off, and $PI_{focuson}$ is a Pull-In signal level when the focus servo is turned on in the reproducing device.

Based on the above, the maximum level of the PI(dldisk, slmode) in a case where the DL disk is reproduced in the SL mode, is expressed by the following equation:

$$PI(dldisk, slmode)=(PI(dldisk, dlmode)-PIref)\times(a/b)\times(c/d)\times(e/f)+PIref \quad (2)$$

Furthermore, the maximum level of the PI (sldisk, slmode) of the SL disk is expressed by the following equation:

$$PI(sldisk, slmode)=(PI(sldisk, slmode)-PIref)\times(e/f)+PIref \quad (3)$$

It then follows that the equation (1) can be obtained from the equations (2) and (3) such that any changes in the above-mentioned parameters (which are condition-dependent as stated above) are taken into consideration for selecting the threshold level $PI_{r1}$. That is, as appreciated from the equation (1), the ratios of these parameters are used instead of their absolute values to remove any effect on the threshold level $PI_{r1}$ from variations in the laser power, etc.

Continuing with the description of FIG. 5, after the above-described $PI_{r1}$ calculations are performed in step S101, the pickup 5 (OPT) is initially moved down (that is, in a direction away from the disk 1) and then stopped by the pickup driver 20 in steps S102 and S103, respectively. At this point (that is, when the OPT is down), the Pull-In signal level is stored in a memory storage labeled "$PI_{max}$" in step S104, thereby initializing the $PI_{max}$.

Next, the pickup driver 20 starts moving the pickup 5 (OPT) up (that is, toward the disk 1) in step S105; and a timer is set for a predetermined time interval in step S106. After the timer is set, in step S107 the CPU 15 stores the Pull-In signal level in a memory storage representatively labeled "$PI_x$", where "x" indicates the sample number. In step S108, the values in the $PI_{max}$ and $PI_x$ are compared; and if $PI_x$ is greater than $PI_{max}$, then the value in $PI_{max}$ is replaced with the current value of $PI_x$ in step S109.

The above process in steps S108 and S109 is repeated until the predetermined time interval (as checked by the timer in step S110) is exceeded. As a result, the maximum level of the Pull-In signal is obtained and stored in $PI_{max}$. The maximum Pull-In signal level (that is, the value in $PI_{max}$) is compared (in step S111) with the reference Pull-In signal level stored in $PI_{r1}$. If the maximum Pull-In signal level is larger than the reference Pull-In signal level (that is, $PI_{max}>PI_{r1}$), then the disk type is set as DVD SL (step S112); while, if the maximum Pull-In signal level is smaller than the reference Pull-In signal level (that is, $PI_{max}<PI_{r1}$), then the disk type is set as DVD DL (step S113), as graphically illustrated in FIG. 6D.

Returning now to the description of FIG. 2, after performing the disk discrimination operation as mentioned above with reference to FIGS. 3–6, the process advances to step S4 of FIG. 2, where the CPU 15 initializes a memory storage representatively labeled "Disk Type Retry". Disk Type Retry stores a count value for the number of times the disk type is attempted to be ascertained accurately in a start-up condition. In step S5, the CPU 15 performs various operations for setting system parameters according to the disk discrimination result in step S3. That is, in step S3, it is determined whether the disk 1 type is DVD SL, DVD DL, or CD, so that according to the result of this determination, the power of the laser diode of the pickup 5, the gain of the system and the like are set accordingly, as required for this particular disk type.

In step S6, the CPU 15 initializes a memory storage labeled "Focus Retry". Focus Retry maintains a count value for the number of times that the focus servo is activated (turned on) during the apparatus start-up. In step S7, a timer is set by the CPU 15 which also controls the servo processor 18 to turn on the focus servo in step S8.

As stated above, the output signals from the photodiode sections A–D (as further processed by the preamplifier 6) are calculated in the matrix circuit 16, and the focus error signal is generated based on these output signals. Then, the focus error signal is supplied to the servo processor 18 for controlling the pickup driver 20 (as a function of the focus error signal) which adjusts the pickup 5 in the focus direction, as illustrated in FIGS. 1 and 6(A).

As further shown in FIG. 2, it is determined in step S9 whether the focus servo is locked (correctly set). If it is not, the process then proceeds to step S10 where the CPU 15 is A operative to execute the necessary instructions for ascertaining whether the timer (as set in step S7) has expired (exceeded a predetermined time interval). If the timer has not yet expired, the process returns to step S9 and steps S9 and S10 are repeated.

When the focus servo is not locked (as determined in step S9) and the timer exceeded the predetermined time interval (as determined in step S10), the process advances to step Sil where the CPU 15 controls the servo processor 18 to turn off the focus servo. In this case, in step S12, the count value of Focus Retry (initially set to 0 in step S6) is incremented by one.

Next, it is determined, in step S13, whether the count value of Focus Retry is equal to 3. In the present example, since Focus Retry is 1, the "NO" decision is made and the process advances to step S14. In step S14, the CPU 15 controls the servo processor 18 to move the pickup 5 in the direction of the outer circumference (periphery) of the disk 1. After that, the process returns to step S7 such that the timer is set once more, and the focus servo is turned on in step S8. In steps S9, S10, the locking operation of the focus servo is attempted and waited until the timer exceeds the predetermined time interval if the focus is not established in the apparatus. In a case where the focus servo is not locked, the focus servo is turned off again in step S11, and the count value of Focus Retry is increased by one.

According to the exemplary embodiment of the present invention, the operation of turning on the focus servo is performed three times when the focus servo is not locked by the time the timer expires during each try. If the third attempt cannot produce the locked focus servo, the "YES" decision is made in step S13, and step S15 is carried out for estimating, with high probability, the disk type.

Namely, as mentioned above, the steps as shown in the flowchart of FIG. 4A are carried out for processing the output signal (the CD detection signal) of the CD discriminating sensor 4, so that a differentiation between a CD or a DVD can be made. If necessary, by performing the steps in the flowchart of FIG. 5, it can be determined whether the disk 1 type is DVD DL or DVD SL. With reference to the above two decision-making operations as illustrated in FIGS. 4A and 5 (that is, CD vs. DVD, and DVD SL disk vs. DVD DL), the differentiation between the DL disk and the SL disk has a higher probability of being erroneous. As a result, in one embodiment of the present invention, an estimation procedure, as shown in FIG. 7, is performed in step S15.

Figure 7:
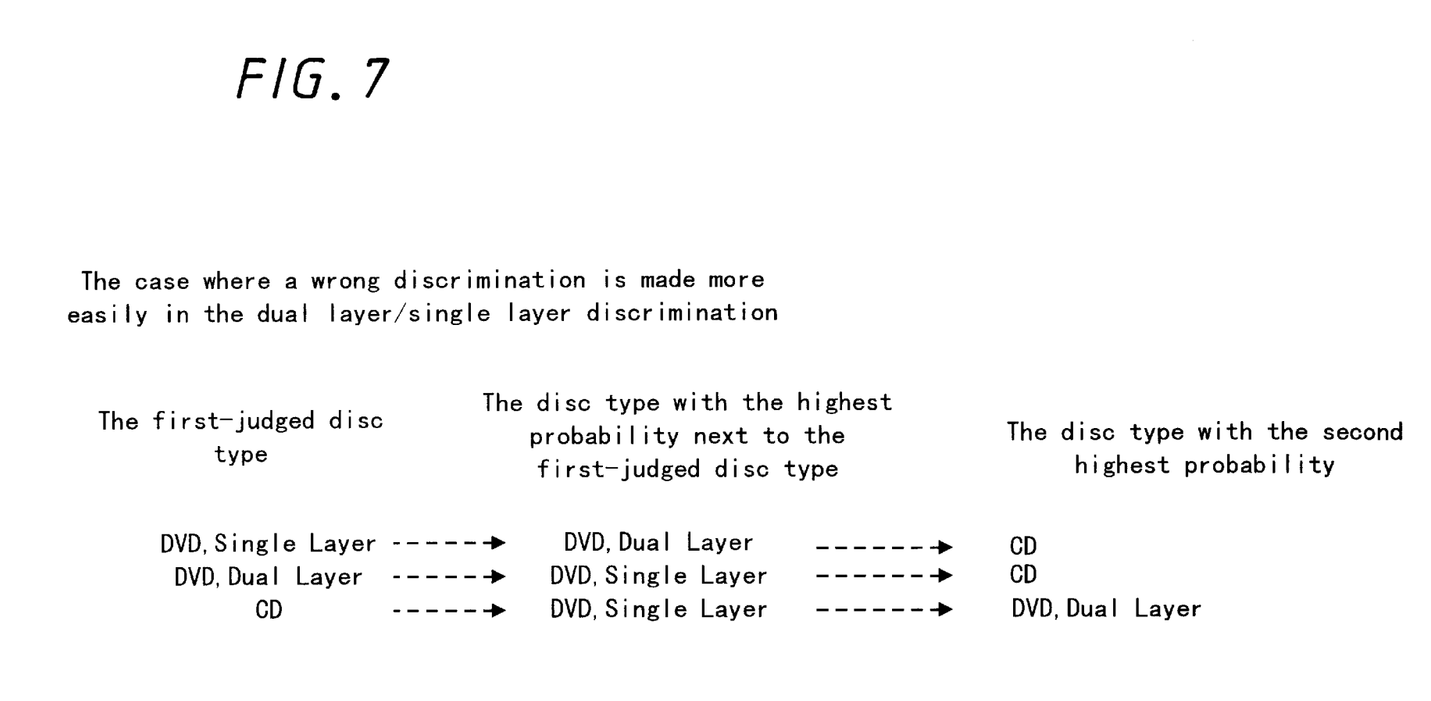
FIG. 7 is a first embodiment of the decision-making process for estimating a disk type with the highest likelihood of success following the initial erroneous detection of the disk type.

In particular, according to FIG. 7, when the disk type in the reproducing device has been determined to be DVD (in accordance with the operation in FIG. 4A) and then SL (in accordance with the operation of FIG. 5), the appropriate parameters corresponding to the determined disk type (DVD SL) are set. Then, an attempt to lock the focus servo is carried out. When three attempts are unsuccessful (that is, the focus servo cannot be locked three times), it is decided that the previous determination on the disk type was erroneous. It, therefore, follows that the disk 1 type has to be either DVD DL or CD in the exemplary embodiment. In this situation, the determination of whether the disk type is DVD DL or CD is based on a likelihood of making an erroneous decision between these two disk types.

In the present case, the erroneous decision is more likely to be made in the DL/SL determination (FIG. 5) than in the DVD/CD determination (FIG. 4A). In other words, the information provided by the CD detection signal from the CD discriminating sensor 4 is considered to be reliable. In view of this, as shown in FIG. 7, when the first decision on the disk type has been erroneous (DVD SL), the probability is higher for the disk type to be DVD DL than CD. Therefore, the CPU 15 sets the appropriate parameters corresponding to the DL disk based on a decision that the DVD DL has the highest likelihood of being the correct disk type after the first-made incorrect decision.

If, however, the focus servo still cannot be set after three attempts, indicating that the disk type is not DVD DL, then the disk 1 is determined to be CD. The appropriate parameters are then set for the CD as the disk type with the second highest probability.

The above-described decision-making process based on the likelihood of the erroneous determination for the representative disk types DVD SL, DVD DL, and CD is illustrated in a first row (from left to right) in FIG. 7. In this case, the disk type was initially determined as DVD SL.

A second row in FIG. 7 illustrates the decision-making process when the initial incorrect decision on the disk type has been DVD DL. In this situation, the probability is high that the disk type is DVD SL (because of high reliability of the detection by the CD discriminating sensor 4, as mentioned above). Accordingly, the next disk type is selected as DVD SL (with the CPU 15 setting the corresponding parameters), while the CD is selected last if the focus servo cannot be locked for the DVD SL.

It will be appreciated that the difference in the reflectance values between the DVD DL and CD is greater than between the DVD SL and CD. The fact that the DVD DL is erroneously considered to be CD (or, conversely, the CD is erroneously considered to be DVD DL) means that the decisions based on the track pitch and on the reflectance values both have been incorrect. Since the probability that these two decisions had been erroneous is small, when the disk type has been determined to be CD incorrectly, it is more likely that the disk type discrimination based on the reflectance value is correct. Hence, according to a third row in FIG. 7, the second most likely disk type in this representative embodiment is DVD SL, and the next most likely disk type is DVD DL.

Figure 8:
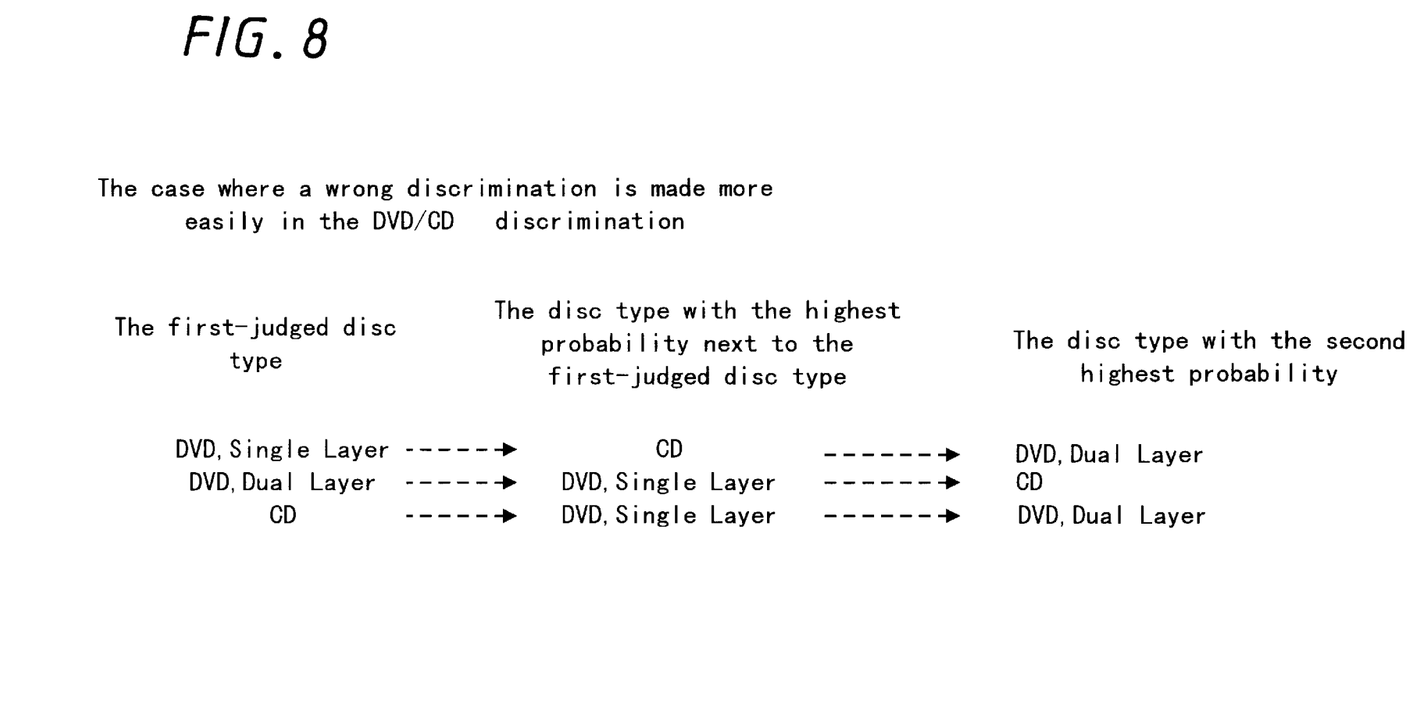
FIG. 8 is another embodiment of the decision-making process for estimating a disk type with the highest likelihood of success following the initial erroneous detection of the disk type.

According to another embodiment of the present invention, FIG. 8 shows a decision-making order for the disk type discrimination when it is more likely to err between the DVD and CD disk types, as occurs in some reproducing devices. When the initial decision has been incorrect that the disk type is DVD SL, a probability that the disk type is CD, which has a reflectance value near the reflectance value of the DVD SL, is high. In other words, if the disk type in the reproducing device is DVD DL, then the disk type discrimination based on the track pitch (using the CD discriminating sensor 4) and/or the discrimination based on the reflectance values are considered to be erroneous. Since the probability that only one of them is wrong is higher than the probability that both are wrong, CD is given a preference as the disk type. Then, when it is determined that the disk type is not CD, the remaining disk type is set as DVD DL. This operation is illustrated in a first row of FIG. 8.

It will be appreciated that the decision-making order in the above case is different from the decision-making order in a case where the erroneous discrimination is more easily made between the DVD DL and DVD SL, as seen by comparing FIG. 7 and FIG. 8.

Continuing with the description of FIG. 8 and a second row in particular, when the disk type determination initially considered to be DVD DL has been in error, the disk type is either DVD SL or CD. If the disk type is CD, it means that not only the DVD/CD discrimination is in error but also the DL/SL discrimination using the reflectance values has been made incorrectly. Accordingly, based on a likelihood that one disk type discrimination operation is correct (between the DVD and CD) instead of both being incorrect, the parameters in the reproducing device are set for the DVD SL. Then, if it is not DVD SL, then the disk type is determined to be CD.

Further according to FIG. 8, when the initial determination has been wrong that the disk type in the reproducing device is CD, the probability that the disk type is DVD SL, having the reflectance value closer to the CD than to DVD SL, is high. Accordingly, in that case, it is decided that the disk type is not CD but DVD SL. Thereafter, if the disk type is not DVD SL (because the focus servo cannot be set), the parameters for the DVD DL are established.

As a result of the above-mentioned operations carried out in step S15 of FIG. 2 and as explained in detail in FIGS. 7 and 8, the disk type with the highest probability is estimated.

Next, in step S16 in FIG. 2, the value held in Disk Type Retry is increased by one such that in the present case it becomes 2. In step S17, whether the updated value is less than 3 is determined. In the present case, since the value is less than 3, the process returns to step S5 and the processing to set parameters corresponding to the disk type as estimated in step S15 is performed once more. Then, similar to the above, the focus servo is turned on in step S8 and whether it is locked is checked in step S9.

If the focus servo cannot be locked after the parameters corresponding to each disk type have been tried three times, a decision is made in step S18 that the disk in the reproducing device is unusable.

Returning to step S9 in a case of the focus servo being locked, the process proceeds to step S19 (FIG. 3) where a memory storage representatively labeled "CLV Retry" is initialized. CLV Retry stores a counter for the number of times the CLV servo is turned on. In step S20, the CPU 15 controls the CLV controller 11 to turn on a rough servo for operating the spindle motor 2. Next, in step S21, the CPU 15 controls the servo processor 18 to turn on a tracking servo, and also controls the CLV controller 11 to turn on the CLV servo in place of the rough servo in step S22.

Further, in step S23, the CPU 15 sets a timer, and in step S24 it is determined whether the CLV servo is locked. When the CLV servo is not locked, it is determined in step S25 whether the timer has exceeded the predetermined time interval. If not, the operation in step S24 continues to be carried out.

The operations in steps S24, S25 are repeated until the timer expires while the CLV servo is not in the locked state.

The process then advances to step S26 where the CPU 15 turns on the rough servo again in place of the CLV servo. Next, after turning off the tracking servo in step S27, the CPU 15 increments the count value held in CLV Retry in step S28. In step S29, whether the updated count value is equal to 3 is checked. If so, the process advances to step S30 where the CPU 15 moves the pickup 5 to the outer periphery and changes the locking position of the CLV servo to a different position. Then, the process returns to step S20 and the corresponding steps are repeated as described above.

If the CLV servo cannot be locked after three attempts within the specified time interval, it is checked in step S31 whether the count value in Disk Type Retry is less than 3. If so, neither the focus servo nor the CLV servo can be locked after the parameters corresponding to each of the three disk types have been consecutively set. Accordingly, in that case, the process advances to step S36, and the disk is considered to be unusable.

When Disk Type Retry is less than 3 in step S31, the process advances to step S32 and the operations for estimating and setting the disk type are carried out based on the likelihood of the erroneous disk type discrimination. The operations are the same as in step S15 described above with reference to FIGS. 7 and 8.

Then in step S33, Disk Type Retry is increased by one, and the focus servo is turned off in step S34. In step S35, the CPU 15 moves the pickup 5 to its home position. Then, the process returns to step S5 (FIG. 2) and the operations to set the parameters corresponding to the disk type estimated in step S32, as well as to lock the focus servo, are performed as described above with reference to FIG. 2. That is, when the CLV servo cannot be locked, even if the focus servo has been locked, it is considered that the disk type has been determined erroneously, and accordingly the operations to lock the focus servo and the CLV servo are performed again.

When the CLV servo is determined to be locked in step S24 (FIG. 3), the focus servo and the CLV servo both are locked. In this case, in step S37 the CPU 15 controls the servo processor 18 to turn on the sled servo. In step S38, the addresses received from the address decoder 12 are stored by the CPU 15 which confirms the continuity of the addresses in step S39. Finally, the disk 1 is reproduced in step S40.

Hereinabove, the DVD and CD disk types have been representatively described. It is understood, of course, that other disk types (as well as a different quantity thereof) can be used for reproducing data.

Having described specific preferred embodiments of the invention with reference to the accompanying drawings, it is to be understood that the invention is not limited to those precise embodiments. Hence, various changes and modifications may be effected by those skilled in the art without departing from the scope or spirit of the invention as defined in the appended claims.

What is claimed is:

1. Apparatus for reproducing data from one of a number of disks, each disk being of a predetermined type, comprising:
   reproducing means for reproducing data from a disk;
   detecting means for performing a detection operation to detect the disk type prior to the reproduction of said data from said disk such that said data can be reproduced from said disk correctly; and
   setting means for setting said reproducing means to a predetermined condition corresponding to another disk type when a disk type has been detected prior to the reproduction of said data from said disk, but upon a failed attempt to reproduce data from said disk it is determined that the detected disk type has been detected erroneously, said predetermined condition being selected, as a function of said detection operation, from at least two other predetermined conditions.

2. The apparatus according to claim 1, further comprising means for performing a differentiating operation to differentiate between a compact disk and a digital video disk such that said detection operation comprises said differentiating operation.

3. The apparatus according to claim 1, further comprising means for performing a differentiating operation to differentiate between a first digital video disk having said data recorded on two layers and a second digital video disk having said data recorded on one layer such that said detection operation comprises said differentiating operation.

4. The apparatus according to claim 1, wherein said setting means sets said reproducing means to said predetermined condition by establishing a number of predetermined parameters such that said data can be reproduced from said disk correctly.

5. The apparatus according to claim 4, wherein said predetermined parameters include one of a beam focus and a disk velocity.

6. The apparatus according to claim 1, wherein said setting means sets said reproducing means to said predetermined condition corresponding to said another disk type when said reproducing means cannot reproduce said data from the detected disk.

7. The apparatus according to claim 1, wherein said setting means sets said reproducing means to said predetermined condition corresponding to said another disk type when said reproducing means unsuccessfully attempts to reproduce said data from the detected disk a predetermined number of times.

8. The apparatus according to claim 1, further comprising means for establishing said disk as unusable when said reproducing means unsuccessfully attempts to reproduce said data from said disk a predetermined number of times for each respective disk type.

9. The apparatus according to claim 1, wherein said each disk has a different data format.

10. The apparatus according to claim 1, wherein said each disk has said data recorded on a different number of layers.

11. The apparatus according to claim 1, wherein said each disk has a different data recording density.

12. A device for determining a type of a disk from which data can be reproduced, comprising:
   means for detecting the disk type prior to the reproduction of said data from said disk such that said data can be reproduced from said disk correctly; and
   means for selecting a second disk type for said disk when a first disk type has been detected prior to the reproduction of said data from said disk, but upon a failed attempt to reproduce data from said disk it is determined that the detected first disk type has been detected erroneously, said selection being based on a probability of said disk being of said second disk type following the erroneous detection of said disk as being of said first disk type.

13. The device according to claim 12, wherein said disk is one of a compact disk, a first digital video disk having said data recorded on one layer, and a second digital video disk having said data recorded on at least two layers.

14. A method for determining a type of a disk from which data can be reproduced, comprising the steps of:

detecting the disk type prior to the reproduction of said data from said disk such that said data can be reproduced from said disk correctly; and selecting a second disk type for said disk when a first disk type has been detected prior to the reproduction of said data from said disk, but upon a failed attempt to reproduce data from said disk it is determined that the detected disk type has been detected erroneously, said selection being based on a probability of said disk being of said second disk type following the erroneous detection of said disk as being of said first disk type.

15. The method according to claim 14, further comprising differentiating between a compact disk and a digital video disk such that said detecting step comprises said differentiating step.

16. The method according to claim 14, further comprising differentiating between a first digital video disk having said data recorded on two layers and a second digital video disk having said data recorded on one layer such that said detecting step comprises said differentiating step.

17. The method according to claim 14, further comprising establishing a number of predetermined parameters for said first and second disk types such that said data can be reproduced from said disk correctly.

18. The method according to claim 17, wherein said predetermined parameters include one of a beam focus and a disk velocity.

19. The method according to claim 14, wherein said second disk type is selected when said data cannot be reproduced from said disk.

20. The method according to claim 14, wherein said second disk type is selected after unsuccessfully attempting to reproduce said data from said disk a predetermined number of times.

21. The method according to claim 14, further comprising establishing said disk as unusable after unsuccessfully attempting to reproduce said data from said disk a predetermined number of times for said first and second disk types.

* * * * *